(12) United States Patent
Cloud et al.

(10) Patent No.: US 6,193,052 B1
(45) Date of Patent: Feb. 27, 2001

(54) CONVEYOR BELT LIFTING ARM

(75) Inventors: Stephen R. Cloud, 13727 W. 82nd St., Lenexa, KS (US) 66215; Robert Mathew Nashert, Kansas City, MO (US); Rodney Lynn Montgomery, Omaha, NE (US)

(73) Assignee: Stephen R. Cloud

( * ) Notice: Subject to any disclaimer, the term of this patent is extended or adjusted under 35 U.S.C. 154(b) by 0 days.

(21) Appl. No.: 09/503,577

(22) Filed: Feb. 14, 2000

Related U.S. Application Data

(62) Division of application No. 08/990,159, filed on Dec. 15, 1997, now Pat. No. 6,044,960.

(51) Int. Cl.[7] .............................. B65G 45/10; B65G 15/60
(52) U.S. Cl. .......................... 198/493; 198/841; 198/866
(58) Field of Search ................................. 198/493, 494, 198/497–499, 813, 837, 841, 866

(56) References Cited

U.S. PATENT DOCUMENTS

| | | | |
|---|---|---|---|
| 3,631,968 | * 1/1972 | Ward | 198/497 |
| 4,917,231 | * 4/1990 | Swinderman | 198/497 |
| 5,426,485 | * 6/1995 | Fujita et al. | 198/489 |
| 5,458,051 | * 10/1995 | Alden et al. | 198/813 |
| 5,887,702 | * 3/1999 | Mott | 198/841 |
| 6,109,428 | * 8/2000 | Harm | 198/841 |

FOREIGN PATENT DOCUMENTS

| | | | |
|---|---|---|---|
| 2503213 | * 4/1980 | (FR) | 198/866 |
| 725968 | * 4/1980 | (SU) | 198/866 |

\* cited by examiner

*Primary Examiner*—Christopher P. Ellis
*Assistant Examiner*—Mark A. Deuble
(74) *Attorney, Agent, or Firm*—Hovey, Williams, Timmons & Collins

(57) ABSTRACT

A conveyor belt lifting device is configured to shift the belt away from the conveyor frame, which facilitates cleaning of the undersurface of the belt and the portions of the frame covered by the belt. The device includes a support bar rotatably mounted to the conveyor frame and at least one arm projecting from the bar, such that rotation of the bar corresponds with swinging of the arm. The arm is configured to engage the undersurface of the belt and shift the belt away from the frame as it swings from a standby position to an operating position.

10 Claims, 2 Drawing Sheets

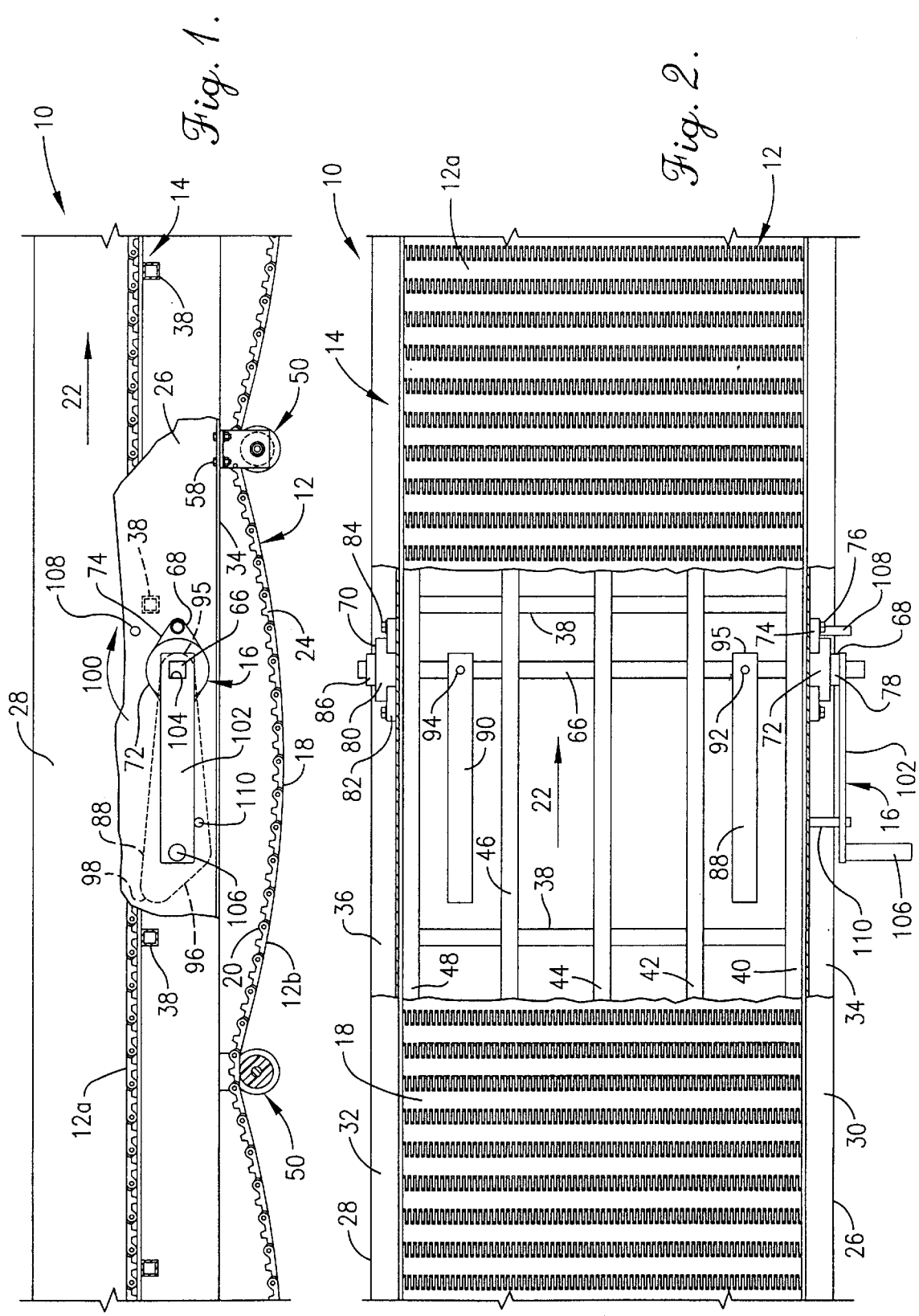

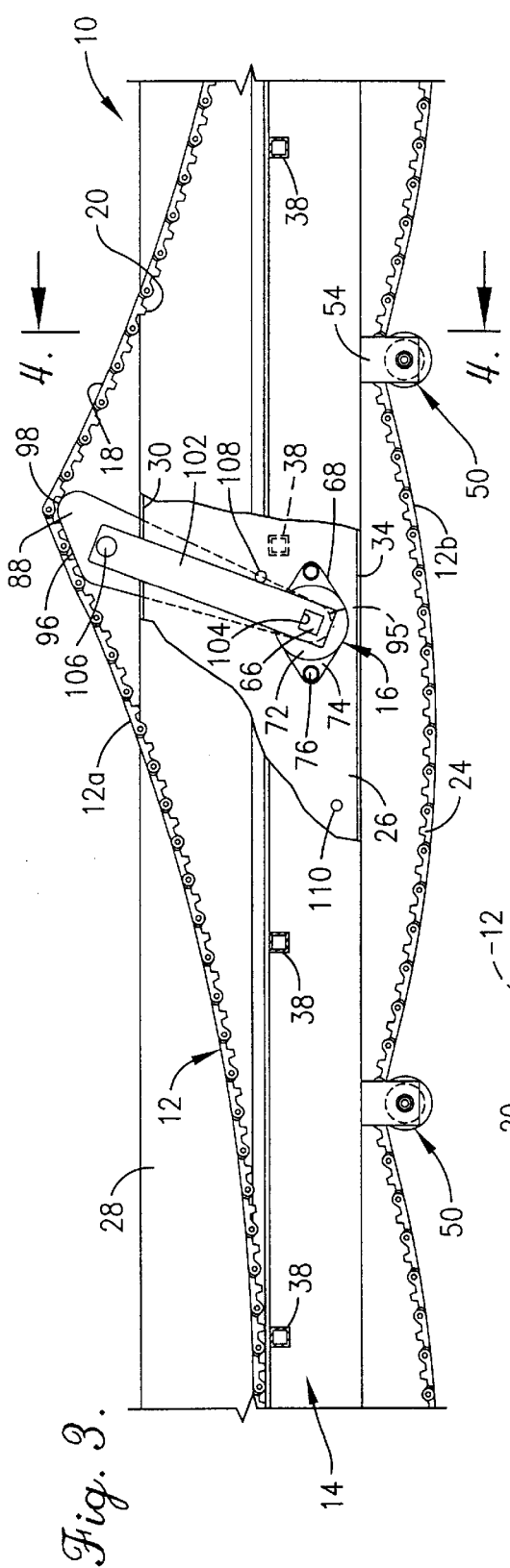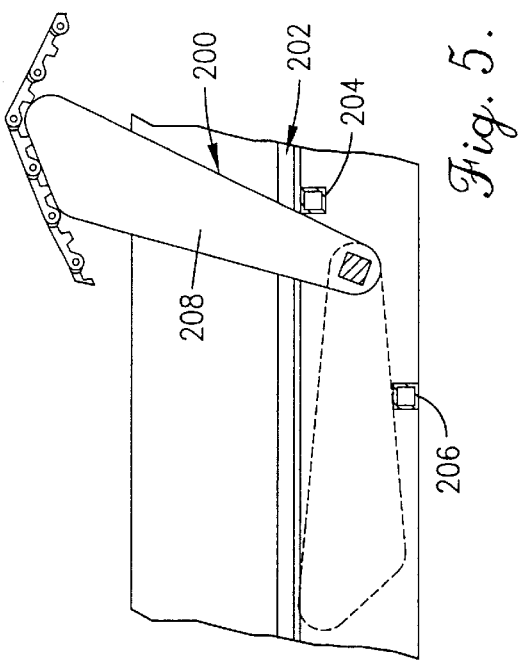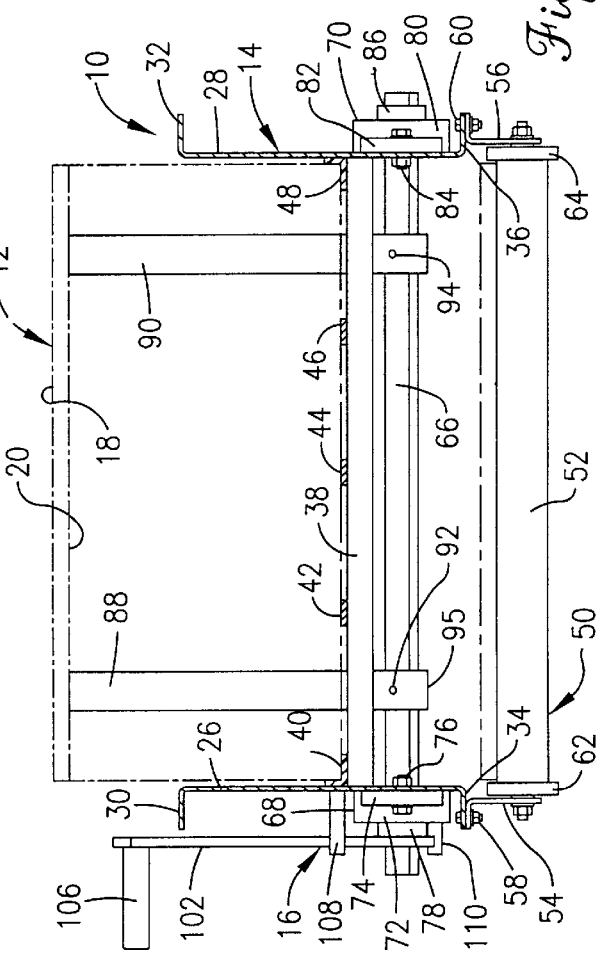

CONVEYOR BELT LIFTING ARM

RELATED APPLICATIONS

This is a divisional application of application Ser. No. 08/990,159 filed Dec. 15, 1997 now U.S. Pat. No. 6,044,960.

BACKGROUND OF THE INVENTION

1. Field of the Invention

The present invention relates generally to belt-type conveyors. More particularly, the present invention concerns a device for lifting the belt away from the underlying support frame, which is particularly useful when cleaning the conveyor.

2. Discussion of the Prior Art

Conveyor belts are utilized in various applications to move items from one location to another. As will be further indicated below, it is often desirable to shift the belt away from the underlying support frame. This is particularly true when the conveyor is used to move items which may have a tendency to soil the belt. It will be appreciated by those ordinarily skilled in the art that soiling of the belt may damage the items or the conveyor or might otherwise adversely affect the function of the belt. In the food processing industry, spillage or retention of food items on the belt surfaces contributes to the additional problems of poor sanitation and the growth of undesirable microorganisms. Accordingly, it is necessary in a significant number of conveyor belt applications to ensure proper cleaning of the belt.

Although some conveyors include means for cleaning the belt during operation (e.g., scrapers or sprayers to rid the outer support surface of material clinging thereto), virtually all conventional cleaning techniques require the conveyor to be routinely shut down so that the belt may be thoroughly cleaned. Scrapers or sprayers are obviously limited to cleaning the outer support surface and consequently are ineffective in removing soilage from the undersurface of the belt. Thus, a thorough cleaning of the conveyor also requires access to the undersurface of the belt. In a conveyor application utilizing an endless belt driven in a linear fashion to present an upper conveying stretch and a lower return stretch, belt movement is typically halted so that the conveying stretch of the belt may be shifted away from the support frame to provide access to the undersurface of the belt.

One known cleaning expedient involves a long pole or bar (e.g., a PVC pipe) that is inserted between the belt and frame and swung in a direction to shift the belt away from the frame. The pole is either held or secured in a desired position once it has been sufficiently swung to shift the belt away from the frame. The undersurface of the belt and underlying frame may thereafter be cleaned by suitable means, such as a hand-held spray washer. Those ordinarily skilled in the art will appreciate that this technique is often accomplished in a haphazard and uncontrolled manner and consequently causes breakage or, at the very least, inordinate wear of the belt. Furthermore, because the forces exerted against the belt by the pole are not equal across the width of the belt, belt stretch may occur unevenly so as to cause belt tracking problems. There are also concerns that the pole does not securely maintain the elevated section of the conveying stretch away from the frame (especially when the pole is held by the operator). In this respect, the belt is likely to be damaged or cause injury to the operator should it fall toward to the frame.

These problems are magnified when the belt is driven while a section of the conveying stretch is pried away from the frame by the pole. In fact, most conveyor operators stop belt movement to avoid such problems. This requires the operator to clean the belt section-by-section. In other words, because the pole is capable of prying only a section of the belt away from the frame, the operator is limited to cleaning the undersurface of only the relatively elevated section before moving along the length of the conveying stretch to lift and clean another section. Clearly, this technique can become quite time consuming when used on relatively lengthy conveyors. A number of conveyor operators utilize hand-held spray washers that continuously discharge water or a water-based cleaning solution once activated. There is consequently water and/or solution wasted as the operator is required to move from one section of the belt to another.

It has also been known to place a spacer between the belt and frame for maintaining the belt in the relatively elevated location. Because the belt must be initially pried away from the frame using the pole, this technique also presents many of the above-noted problems. It will be appreciated that some spacers have been provided with a triangular shape so that the belt moves gradually along the upwardly sloping surface of the spacer from the frame. Although this configuration is designed to permit the belt to be driven as a section of the conveying stretch is lifted away from the frame, it is still problematic. For example, there is a risk that the moving belt will dislodge the spacer and thereby cause damage to the belt and/or injury to the operator.

OBJECTS AND SUMMARY OF THE INVENTION

Responsive to these and other problems, an important object of the present invention is to provide a device for shifting the belt away from the frame so as to provide access to the undersurface of the belt and the portions of the frame covered by the belt. It is an additional object of the present invention to provide a belt shifting device that reduces the time necessary for cleaning the undersurface of the belt and conserves the water and/or the solution used to clean the belt. Particularly, it is an object of the present invention to provide a belt shifting device that permits the belt to be driven as a section of the belt is shifted away from the frame so that the operator may stand in one location to clean the entire undersurface of the belt. Another important object of the present invention is to provide a belt shifting device that is unlikely to damage or unduly wear the belt. An additional important object of the present invention is to provide a device that shifts the belt away from the frame in a controlled manner. It is also an important object of the present invention to provide a belt shifting device that has a simple, inexpensive, yet durable construction. Yet another object of the present invention is to provide a device that is safe and easy to use. In this respect, an important object of the present invention is to provide a device that securely maintains the belt in its relatively shifted position, even while the belt is driven.

According to these and other objects apparent from the following description of the preferred embodiment, the present invention concerns a device for shifting a conveyor belt away from the underlying support frame so as to facilitate cleaning of the undersurface of the belt. The device includes a rotatable support bar and an arm projecting from the bar such that rotation of the bar effects swinging of the arm. The arm is configured to engage the undersurface of the belt and shift the belt away from the frame as the arm is swung from a standby position to an operating position. The support bar is rotatably mounted to the conveyor frame with a pair of bearing assemblies.

The arm has a substantially flat distal end disposed at an angle relative to the radial line, along which the arm extends from the rotational axis of the support bar. Accordingly, when the arm is in its operating position, the belt exerts a force against the distal end that causes a moment about the rotational axis of the support bar so as to urge the arm to swing in a direction toward the operating position. The device includes an operating stop configured to prevent swinging of the arm in that direction beyond the operating position. Moreover, the distal end slopes gradually upwardly in the direction of belt travel so that the belt may be driven when the arm is in the operating position. As indicated above, this will allow the operator to remain in one location as the undersurface of the belt is cleaned, which will save time and conserve water and/or cleaning solution. It will be noted that the risk of inadvertent shifting of the arm from the operating position to the standby position is virtually eliminated because the arm is biased toward the operating position by the weight of the belt.

If desired, the device may also include a standby stop for restricting swinging of the arm in an opposite direction beyond the standby position, such that the arm is limited to swinging movement between the standby and operating positions. As will be further indicated below, the standby stop is particularly useful in preventing contact between the arm and the opposite stretches of a horizontally oriented, endless conveyor belt. The operating and standby stops are fixed relative to the frame and, in some instances, may form part of the frame.

The device further includes a lever coupled with the support bar for controlling swinging of the arm between its standby and operating positions. The lever may include a handle so that swinging of the arm is manually controlled. Further, the lever is preferably removable so that, when the device is not being used, the handle may be stored at a remote location which is less likely to interfere with conveyor operations.

Other aspects and advantages of the present invention will be apparent from the following detailed description of the preferred embodiments and the accompanying drawing figures.

BRIEF DESCRIPTION OF THE DRAWING FIGURES

A preferred embodiment of the invention is described in detail below with reference to the attached drawing figures, wherein:

FIG. 1 is a fragmentary side elevational view of a belt-type conveyor having a belt lifting device constructed in accordance with the principles of the present invention, with the arms of the device being in their standby position;

FIG. 2 is a fragmentary top elevational view of the conveyor shown in FIG. 1, with a portion of the belt being removed to show the lifting device;

FIG. 3 is a fragmentary side elevational view similar to FIG. 1, but illustrating the lifting arms in their operating position such that the belt has been lifted away from the underlying support frame;

FIG. 4 is an enlarged vertical cross-sectional view taken along line 4—4 in FIG. 3; and FIG. 5 is an enlarged side elevational view of an alternative embodiment of the present invention, wherein the device utilizes a pair of crossbeams of the frame as stops for selectively maintaining the lifting arms in their operating and standby positions.

DETAILED DESCRIPTION OF THE PREFERRED EMBODIMENTS

As shown in FIG. 1, the conveyor 10 selected for illustration generally includes a belt 12 for conveying items (not shown), a frame 14 supporting the belt 12 in a substantially horizontal orientation, and a belt lifting device 16 constructed in accordance with the principles of the present invention. The belt 12 presents an outer support surface 18 configured to support items thereon and an opposite undersurface 20. The illustrated belt 12 is formed of an endless web and is supported by the frame 14 to present an upper conveying stretch 12a moving in a rightward direction, as depicted by arrow 22 in FIGS. 1 and 2, and a lower return stretch 12b. Furthermore, the illustrated belt 12 comprises a so-called "plastic belt" having of a plurality of interconnected, plastic links 24 which afford the belt both flexibility and permeability. It will be appreciated, however, that the principles of the present invention are not limited to the illustrated belt construction. For example, the inventive lifting device 16 is not limited to use with endless belt constructions, but rather may be provided on any conveyer having an elongated conveying stretch (such as a conveyor with a belt that is not endless).

The frame 14 includes a pair of laterally spaced sidewalls 26 and 28, each of which includes an outwardly projecting upper flange 30 and 32 and an outwardly projecting lower flange 34 and 36, respectively (see FIG. 4). As perhaps best shown in FIG. 2, the sidewalls 26 and 28 serve to enclose the belt 12 along its lateral boundaries. Fixed between the sidewalls 26 and 28 are a plurality of longitudinally spaced cross beams 38, which in the preferred embodiment are tubular and have a square cross-sectional shape. A plurality of longitudinally extending, laterally spaced strips 40,42,44, 46,48 are supported on the cross beams 38 to cooperatively define a substantially horizontal slider bed for supporting the conveying stretch 12a of the belt. It will be noted that the outermost strips 40 and 48 are generally L-shaped for presenting upstanding portions that promote proper belt tracking. Although the illustrated slider bed has a substantially open configuration, it will be appreciated that the principles of the present invention are equally applicable to a solid bed or panel for slidably supporting the conveying stretch 12a of the belt 12.

The frame 14 further includes a plurality of roller assemblies 50 for supporting the return stretch 12b of the belt. For the sake of brevity, only one of the roller assemblies 50 is described in detail, with the understanding that the remaining roller assemblies are similar in construction. As perhaps best shown in FIG. 4, the roller assembly 50 includes an elongated roller 52 journaled for rotation on a pair of L-shaped support brackets 54 and 56. The horizontal leg of the bracket 54 is fastened to the lower flange 34 of the sidewall 26 by a pair bolt assemblies 58, with the bracket 56 being similarly attached to the sidewall 28 by a pair of bolt assemblies 60. The roller is provided with a pair of ribs 62 and 64 adjacent opposite ends thereof for promoting proper belt tracking.

In view of the foregoing, the conveyor 10 is configured to move items (not shown) supported on the outer surface 18 of the belt 12 in a rightward direction. As indicated above, it may be necessary to routinely lift the conveying stretch 12a of the belt away from the slider bed, especially when the conveyor 10 is used in an application in which the belt has a tendency to become soiled. For example, should the conveyor 10 be used in the food processing industry, food items (not shown) carried along the conveying stretch 12a of the belt 12 may likely spill or otherwise soil the belt 12 and underlying portions of the frame 14. It is therefore necessary to thoroughly clean the conveyor 10 so to avoid damage and, in the case of a food processing application, poor sanitation. The outer support surface 18 may simply be sprayed or otherwise cleaned as it travels along the conveying stretch 12a. However, it is also necessary to clean the undersurface 20 of the belt 12 and the portions of the frame 14 covered by the belt 12, such as the lower sections of the sidewalls 26,28, the cross beams 38 and the strips 40,42,44,46,48. Obviously, such cleaning requires that the belt 12 be shifted away from the frame 14 for providing sufficient access to these components. It will be noted that the belt 12 has sufficient slack to be shifted away from the frame 14.

In this respect, the belt lifting device 16 is configured to lift the conveying stretch 12a of the belt away from the slider bed so as to provide access to the undersurface 20 and those various portions of the frame covered by the belt. Particularly, the device 16 includes an elongated support bar 66 journaled on the sidewalls 26 and 28 by bearing assemblies 68 and 70, respectively. The support bar 66 has a square cross-sectional shape for purposes which will subsequently be described.

The bearing assembly 68 includes an outer race 72 and a flange 74 projecting from the race 72. The flange 74 is fastened to the sidewall 26 by bolt assemblies 76 for preventing relative movement between the outer race and the sidewall 26. It will be appreciated that the bearing assembly 78 further includes an inner race (not shown) fixed to the support bar 66 and a plurality of ball bearings (not shown) retained between the inner and outer races for permitting relative rotational movement therebetween. A retaining collar 78 is secured to the support bar 66 just outboard of the outer race 72 for preventing axial shifting of the bar 66 relative to the race 72. The bearing assembly 70 similarly includes an outer race 80, a flange 82 fastened to the sidewall 28 by bolt assemblies 84, an inner race (not shown), a plurality of ball bearings (not shown) disposed between the inner and outer races, and a retaining collar 86. As those ordinarily skilled in the art will appreciate, it is entirely within the ambit of the present invention to utilize various other bearing assembly constructions. For example, it may desirable to utilize a plastic sleeve disposed between the inner and outer races.

The lifting device 16 further includes a pair of laterally spaced arms 88 and 90 projecting in generally the same radial direction from the support bar 66. In the illustrated embodiment, the arms 88 and 90 each have a square-shaped opening for snugly receiving the square-shaped support bar 66 therein. The arms 88 and 90 are each provided with a set screw 92 and 94, respectively, to prevent shifting of the arm along the bar 66. Further, because of the complementary square shapes of the support bar 66 and the openings in the arms 88 and 90, rotation of the bar 66 effects swinging of the arms 88 and 90. As will be further described below, the arms 88 and 90 are configured to shift the belt 12 away from the frame 14 as they swing from a standby position (see FIG. 1) to an operating position (FIG. 3).

Each arm includes a proximal end 95 defining the opening receiving the support bar 66, and a substantially flat distal end 96 terminating at an outermost rounded edge 98 (only the arm 88 being shown in detail in FIGS. 1 and 3). It will be noted that the sides of the arm converge as the proximal end 95 is approached from the distal end 96, with one of the sides and the distal end 96 cooperatively defining the outermost edge 98. As the arms 88 and 90 swing from the standby position to the operating position in the direction of arrow 100 (shown in FIG. 1), the rounded outermost edges 98 move along an arcuate path into engagement with the undersurface 20 of the belt 12. Because it is preferred to halt belt movement during swinging of the arms 88 and 90, the outermost edges 98 must slide along the undersurface 20 of the belt 12 as the arms 88 and 90 are swung between the standby and operating positions. In this respect, the arms are preferably formed of an ultra-high-molecular-weight plastic, such as polyethylene, so as to facilitate such sliding interengagement. Moreover, the upward force exerted against the undersurface 20 of the belt 12 by the outermost edges 98, during swinging of the arms 88 and 90 to the operating position, cause the belt to lift away from the slider bed. Eventually, the outermost edges 98 move past a dead-center position such that the undersurface 20 of the belt 12 begins to rest against the distal ends 96.

As perhaps best shown in FIG. 3, the distal ends 96 are disposed at an acute angle relative to the radial direction at which the arms 88 and 90 project from the support bar 66. Accordingly, forces exerted against the distal ends 96 of the arms 88 and 90 are not directed toward the rotational axis of the support bar 66, but rather such forces create a moment about the rotational axis and thereby urge the arms to swing in the direction of arrow 100. In this respect, as the weight of the relatively elevated portion of the conveying stretch 12a is carried by the distal ends 96 (after the outermost edges 98 have moved past the dead-center position), the arms 88 and 90 are urged in a clockwise direction (when viewing FIGS. 1 and 3). It will be appreciated that once the arms 88 and 90 reach the operating position, the weight of the elevated portion of the conveying stretch 12a is carried primarily by the distal ends 96.

Furthermore, once the arms 88 and 90 reach the operating position, the distal ends 96 slope gradually upwardly in the direction of belt movement (i.e., in the direction of arrow 22). The distal ends 96 consequently present an eased surface for supporting the relatively elevated section of the belt 12 so that the elevated section of the belt is not required to angle sharply from the slider bed. It will be appreciated that this configuration permits the belt 12 to be driven when the arms 88 and 90 are in their operating position, which allows the operator to clean the entire undersurface 20 of the belt while standing adjacent the lifting device 16. Particularly, the driven belt 12 (moving in the direction of arrow 22) first engages the rounded leading edges of the arms 88 and 90 defined between the distal ends 96 and the leading sides of the arms, then slides along the distal ends 96 which slope upwardly from the leading edges, and finally disengages the arms 88 and 90 at the rounded outermost edges 98. The illustrated arm construction has proven to be less likely to cause belt damage or injury to the operator than conventional cleaning techniques (not shown) which often caused the belt to angle sharply upwardly from the slider bed and abruptly around the structure (e.g., a pole) used to lift the belt away from the bed. Additionally, because the moving belt 12 exerts forces (including a gravitational force, as described above, and a frictional force directed generally in the direction of belt travel) against the arms 88 and 90 which bias the arms toward the operating position, the risk of inadvertent shifting of the arms from the operating position to the standby position is virtually eliminated.

The lifting device 16 further includes a lever 102 for controlling swinging of the arms 88 and 90 between the standby and operating positions. Similar to the arms 88 and 90, the lever 102 has a square-shaped opening 104 receiving the support bar 66. Accordingly, swinging of the lever 102 corresponds with rotation of the support bar 66 and swinging of the arms 88 and 90. In this embodiment, the support bar 66 projects outwardly beyond the sidewall 26 to present an end that is slidably received within the opening 104 defined in the lever 102. Accordingly, the lever 102 may be removed when desired. It will be appreciated that this feature is particularly advantageous when the conveyor 10 is provided with several lifting devices 16 (only one removable lever 102 is necessary for the entire conveyor) or when it is desired to store the lever 102 in a remote location. The illustrated lever 102 further includes a cylindrically shaped handle 106 projecting outwardly from the distal end thereof. The handle 106 permits manual control of swinging of the arms 88 and 90 between the standby and operating positions. However, it is entirely within the ambit of the present invention to swing the lever 102 with a power mechanism, such as a hydraulic cylinder (not shown), if desired.

In the embodiment shown in FIGS. 1–4, the lifting device 16 includes a pair of cylindrically shaped rods 108 and 110 secured to the sidewall 26. If desired, the rods 108 and 110 may comprise a bolt assembly received within a hole (not shown) punched in the sidewall 26. In any construction, the rods 108 and 110 project sufficiently outwardly from the sidewall 26 to engage the lever 102 when it is received on the support bar 66. Accordingly, the rods 108 and 110 serve as stops and consequently limit the lever 102 to swinging movement therebetween. Particularly, the rod 108 is in a location to engage the lever 102 when the arms 88 and 90 are in the operating position (see FIG. 3). As indicated above, the arms 88 and 90, and thereby the lever 102, are urged in a clockwise direction (when viewing FIG. 3) by the weight of the elevated portion of the belt. However, the interengagement of the lever 102 and rod 108 prevent the arms 88 and 90 from swinging beyond the operating position. On the other hand, the rod 110 is in a location to engage the lever 102 when the arms 88 and 90 are in the standby position. In the illustrated embodiment, it is desirable to have the arms 88 and 90 disengaged from the belt 12 (both the conveying stretch 12a and the return stretch 12b) when not in use, otherwise the arms would place an inordinate amount of wear on the undersurface 20 of the belt. Because the arms 88 and 90 consequently have a substantially horizontal orientation in the standby position (see FIG. 1), the lever 102 is urged downwardly in a counterclockwise direction. However, the interengagement of the lever 102 and the standby stop 110 prevent the arms from swinging beyond the standby position and into engagement with the return stretch 12b of the belt 12.

The operation of the present invention should be apparent from the foregoing description. It is therefore sufficient to explain that the lifting arms 88 and 90 are normally in the standby position during operation of the conveyor 10. However, when it is desired to lift the conveying stretch 12a of the belt 12 away from the slider bed (e.g., to facilitate cleaning of the conveyor 10), the handle 106 is gripped by the operator and forced in a manner that causes the lever 102 to swing in the direction of arrow 100. Prior to performing this step, it may be necessary to slide the lever 102 onto the end of the support bar 66, if it has not already been done so. Swinging of the lever 102 causes the arms 88 and 90 to swing in the same direction. Consequently, the outermost edges 98 of the arms 88 and 90 contact the undersurface 20 of the belt 12 and cause the overlying portion of the conveying stretch 12a to rise from the slider bed. If desired, belt movement may be halted prior to shifting the conveying stretch 12a away from the slider bed. Once the outermost edges 98 of the arms 88 and 90 move past the dead-center position, the undersurface 20 of the belt 12 engages the distal ends 96 such that the arms are urged in the direction of arrow 100 by the weight of the relatively elevated portion of the conveying stretch 12a. In fact, the handle 106 may actually be released and the arms 88 and 90 will continue to swing in the direction of arrow 100 until the lever 102 engages the operating stop 108 (until the arms 88 and 90 reach the operating position). The belt 12 may be driven in the direction of arrow 22 when the arms 88 and 90 are in the operating position so that the operator may stand in one location while cleaning the entire undersurface 20 of the belt. When it is desired to return the conveying stretch 12a to its normal horizontal orientation, the handle 106 is gripped and forced in a manner that causes the lever 102 to swing in the opposite direction of arrow 100. It will be appreciated that once the outermost edges 98 of the arms 88 and 90 move past the dead-center position, the handle 106 may be released and the weight of the belt 12 will force the arms 88 and 90 in the opposite direction of the arrow 100 until the lever 102 engages the standby stop 110 (until the arms 88 and 90 reach the standby position).

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the device 16 may include as many lifting arms as desired. Further, the device 16 may be utilized on various other conveyor constructions.

In the alternative embodiment shown in FIG. 5, the lifting device 200 has been mounted to the conveyor frame 202 so as to utilize a pair of crossbeams 204 and 206 as the operating and standby stops. Particularly, the crossbeam 204 is in a location to engage the arms 208 (only one of the arms being shown) so as to prevent swinging of the arms 208 beyond the operating position. As shown in phantom lines, the crossbeam 206 is in a location to engage the opposite sides of the arms 208 for preventing swinging of the arms 208 beyond the standby position. In both embodiments, the stops are fixed relative to the frame and may, in fact, be considered part of the frame.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A conveyor belt lifting arm for attachment to a rotatable support bar presenting a rotational axis, said arm comprising:

an elongated body presenting a proximal end, an outermost edge, and a belt support face configured to engage the underside of the conveyor belt when the conveyor belt is in its lifted position, said body having attachment means adjacent said proximal end for attaching the arm to the support bar so that the outermost edge is spaced from the proximal end in a radial direction relative to the rotational axis of the support bar, said belt support face projecting from the outermost edge at an acute angle relative to said radial direction.

2. A conveyor belt lifting arm as claimed in claim 1, said attachment means comprising an opening for receiving the support bar.

3. A conveyor belt lifting arm as claimed in claim 2, said opening be rectangular shaped.

4. A conveyor belt lifting arm as claimed in claim 2, said attachment means including a set screw threadably coupled with the body to selectively project into the opening.

5. A conveyor belt lifting arm as claimed in claim 1, said body being formed of an ultra-high-molecular-weight plastic material.

6. A conveyor belt lifting arm as claimed in claim 1, said belt support face being substantially flat.

7. A conveyor belt lifting arm as claimed in claim 1, said body presenting a distal end defining said belt support face and a pair of sides extending along the length of the body between the proximal and distal ends.

8. A conveyor belt lifting arm as claimed in claim 7, said outermost edge being rounded.

9. A conveyor belt lifting arm as claimed in claim 4, said outermost edge being cooperatively defined by the distal end and one of the sides of the body.

10. A conveyor belt lifting arm as claimed in claim 9, said body being formed of an ultra-high-molecular-weight plastic material.

* * * * *